United States Patent
Remington et al.

(10) Patent No.: US 6,930,416 B1
(45) Date of Patent: Aug. 16, 2005

(54) COMPLIANT STATOR

(75) Inventors: Paul J. Remington, Sudbury, MA (US); Ronald Coleman, Arlington, MA (US); Bruce Stuart Murray, Winchester, MA (US)

(73) Assignee: BBNT Solutions LLC, Cambridge, MA (US)

( * ) Notice: Subject to any disclaimer, the term of this patent is extended or adjusted under 35 U.S.C. 154(b) by 84 days.

(21) Appl. No.: 10/060,698

(22) Filed: Jan. 30, 2002

Related U.S. Application Data

(60) Provisional application No. 60/279,398, filed on Mar. 28, 2001.

(51) Int. Cl.[7] .............................................. H02K 1/00
(52) U.S. Cl. ..................... 310/51; 310/216; 310/258; 310/59; 310/254
(58) Field of Search ..................... 310/51, 216, 258, 310/59, 245, 254; 290/216, 59

(56) References Cited

U.S. PATENT DOCUMENTS 1,688,891 A * 10/1928 Spreen 4,363,987 A * 12/1982 Vorotyntseva ............... 310/216

OTHER PUBLICATIONS

Slavik, C.J., "Dynamic Modeling of a Rigid Rotor on Flexible Supports, Including Radial Magnetic Forces," Lockheed Martin, KAPL, Inc., NOFORN Power/Acoustic Technology Technical Memorandum, Nov. 6, 2000, pp. 1-16.

* cited by examiner

Primary Examiner—Darren Schuberg
Assistant Examiner—Iraj A. Mohandesi
(74) Attorney, Agent, or Firm—Ropes & Gray LLP

(57) ABSTRACT

A compliant stator motor is disclosed. In one implementation, the motor (200) includes a rotor (210), a stator (220) having main and auxiliary windings, an outer motor case (230), and a group of isolators (240) positioned between the stator (220) and outer motor case (230) to enhance forces applied to the foundation (260) due to excitation of the auxiliary windings. In another implementation, the motor (300) includes a rotor (310), a stator (320) including main and auxiliary windings, linear bearings (320) configured to constrain a motion of the stator (320) to an axial direction, and isolators (330) connected to the stator (320) and configured to enhance axial forces applied to the foundation due to excitation of the auxiliary windings.

8 Claims, 3 Drawing Sheets

COMPLIANT STATOR

RELATED APPLICATION

This application claims priority under 35 U.S.C. § 119 based on U.S. Provisional Application Ser. No. 60/279,398, filed Mar. 28, 2001, the disclosure of which is incorporated herein by reference.

GOVERNMENT CONTRACT

The U.S. Government has a paid-up license in this invention and the right in limited circumstances to require the patent owner to license others on reasonable terms as provided for by the terms of Contract No. N00014-97-C-0075 awarded by the Office of Naval Research.

BACKGROUND OF THE INVENTION

1. Field of the Invention

The present invention relates generally to electric motors and, more particularly, to systems and methods for providing a compliant connection between the stator of an electric motor and the motor case.

2. Description of Related Art

Auxiliary windings in electric motors can be made to generate forces and moments in six-degrees-of-freedom. In this way, a motor can be made to act like an actuator offering the potential for canceling forces applied externally to the motor shaft or housing. A problem that arises, however, is that the high stiffness commonly found between the rotor and the stator reduces the magnitude of the resultant forces that can be applied to the foundation through the rotor, especially at low frequency.

Accordingly, there is a need in the art for systems and methods that allow the magnitude of the resultant forces applied to the rotor to be enhanced.

SUMMARY OF THE INVENTION

Systems and methods consistent with the present invention address this and other needs by providing a compliant connection between a motor's stator and outer motor case. The compliant connection allows the auxiliary windings to transmit higher forces to the foundation at lower frequency than would be possible for conventional rigidly-connected stators.

In accordance with the principles of this invention as embodied and broadly described herein, a motor includes a rotor, a stator including main and auxiliary windings, an outer motor case, and a group of isolators positioned between the stator and the outer motor case.

In another implementation consistent with the present invention, an electromechanical machine includes a rotor, a stator including main and auxiliary windings, linear bearings configured to constrain a motion of the stator to an axial direction, and a group of isolators connected to the stator and configured to attenuate a force exerted by the stator in the axial direction.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the present invention provide compliance between the stator and the motor case to increase the effectiveness of the auxiliary windings in generating forces on the motor foundation. Introducing compliance into the rotor mounting system might lead to unacceptable shaft dynamics. Because the shaft rotates, any imbalance in it could lead to unacceptably large lateral deflections of the rotor. These problems substantially go away if the compliance is introduced into the stator/motor case rather than the rotor. Accordingly, systems and methods consistent with the present invention provide a very stiff bearing assembly with a resiliently mounted stator/motor case assembly. The stiff rotor mounting minimizes the deflections due to any imbalances and efficiently transmits any external loads, such as thrust, from the shaft to the foundation.

Exemplary System Configuration

Figure 1:
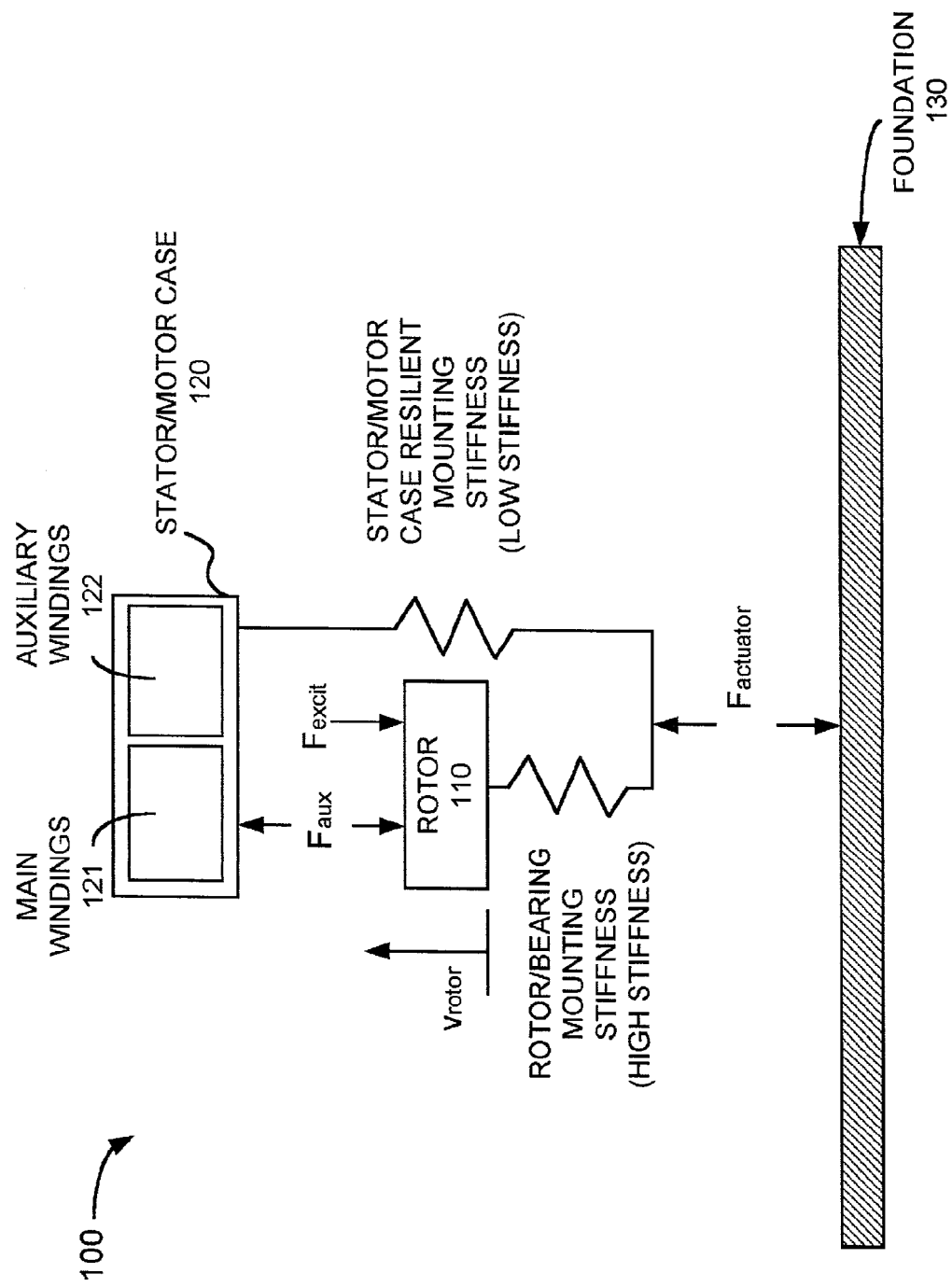
FIG. 1 illustrates an exemplary overall configuration of a compliant stator motor according to implementations consistent with the present invention.

FIG. 1 illustrates an exemplary overall configuration of a compliant stator motor 100 according to implementations consistent with the present invention. Motor 100 includes a rotor 110 and a stator/motor case 120 connected to a foundation 130. The rotor 110 may include any type of rotor, such as those used in permanent magnet electric motors. The stator/motor case 120 includes main windings 121, auxiliary windings 122, and, as will be described in detail below, isolation mounts that add compliance between the stator and outer motor case.

As illustrated, the auxiliary windings 122 apply forces ($F_{aux}$) equally to the rotor 110 and stator 120. External forces ($F_{excit}$) may be applied to the rotor 110. The stiffness with which the rotor 110 connects to the foundation 130 is high and the stiffness with which the stator/motor case 120 connects to the foundation is low. During those instances where the resonant frequency of the stator/motor case 120 on its mounting stiffness is lower than the frequencies at which forces ($F_{actuator}$) on the foundation 130 are to be generated, the stator/motor case 120 mass reacts the auxiliary winding forces and transmits these forces with little attenuation through the rotor 110 to the foundation 130.

Figures 2A, 2B:
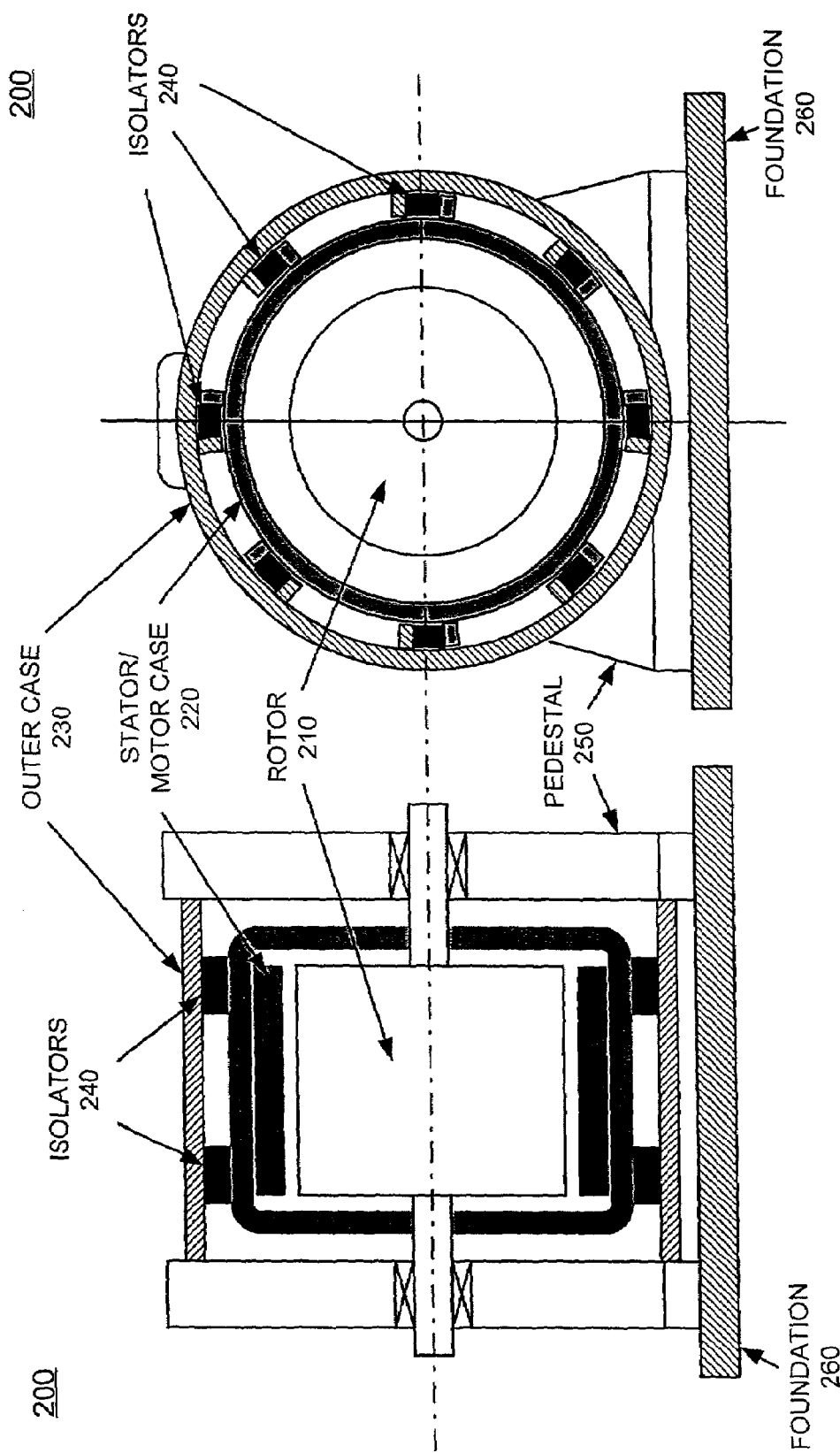
FIGS. 2A and 2B illustrate an exemplary detailed view of a compliant stator motor in an implementation consistent with the present invention.

FIGS. 2A and 2B illustrate an exemplary detailed view of a compliant stator motor 200 according to an implementation consistent with the present invention. As illustrated, the compliant stator motor 200 includes a rotor 210, a stator/motor case 220, an outer case 230, and isolation mounts (or isolators) 240. The rotor 210, stator/motor case 220, outer case 230, and isolators 240 are mounted in a pedestal 250 that is hard mounted to the foundation 260.

The outer case 230 provides a mounting location for the resilient isolators 240 that support the stator/motor case 220 and reacts the torque applied by the stator 220 to the rotor 210. The outer case 230 rigidly attaches to the pedestal 250. The impedance of the outer case where the isolators are attached should be much greater than the impedance of the isolators.

The inner motor case 220 supports the stator and connects to the outer case 230 by a number of resilient isolators 240. In an implementation consistent with the present invention, the isolators 240 may be formed of an elastomeric (i.e., rubber-like) material. The size of the isolators 240 depends on the size of the motor being supported. The larger the motor size, the larger the size of the isolators 240. The isolators 240 may be oriented to be in shear for radial and axial motor case deflections (presumably high compliance) and in compression for rotation about the motor axis (better able to carry the high torque loads). The isolators 240 may be symmetrically located about the axis of the motor, so that when the isolators 240 deflect under the torque load, the axis of the stator/motor case 220 does not move out of alignment with the rotor 210. Eight isolators 240 are illustrated in FIG. 2B for simplicity. In practice, more or fewer isolators 240 may be used.

If the stator 220 is allowed to move radially, as well as axially, the isolator 240 stiffness should be chosen appropriately. The isolator 240 cannot be made too compliant in the radial direction because if the isolators 240 do not provide sufficient stiffness, the attractive magnetic forces in the rotor-stator gap could cause the gap to close and the rotor 210 and stator 220 to lock together. On the other hand, it is desirable to make the natural frequency of the stator/motor case 220 on the isolators 240 to be as low as practical (requiring very compliant isolation mounts 240) so as to increase the effectiveness of the auxiliary winding forces over as broad a range of frequency as possible.

The motion of the stator 220 relative to the rotor 210 in the radial direction may result in torque modulation due to the decrease in the rotor/stator gap over a portion of the circumference of the motor 200. Because of the nonlinear relationship between motor torque and gap size, displacement of the stator 220 relative to the rotor 210 in the radial direction may result in an increase in torque. Consequently, when the auxiliary winding forces are reacted against the stator/motor case 220, the stator/motor case 220 may move changing the gap and potentially modulating the motor torque. In such an event, the auxiliary or main winding system may be used to modulate the torque in order to counteract the unwanted modulation.

Alternative System Configuration

Figure 3:
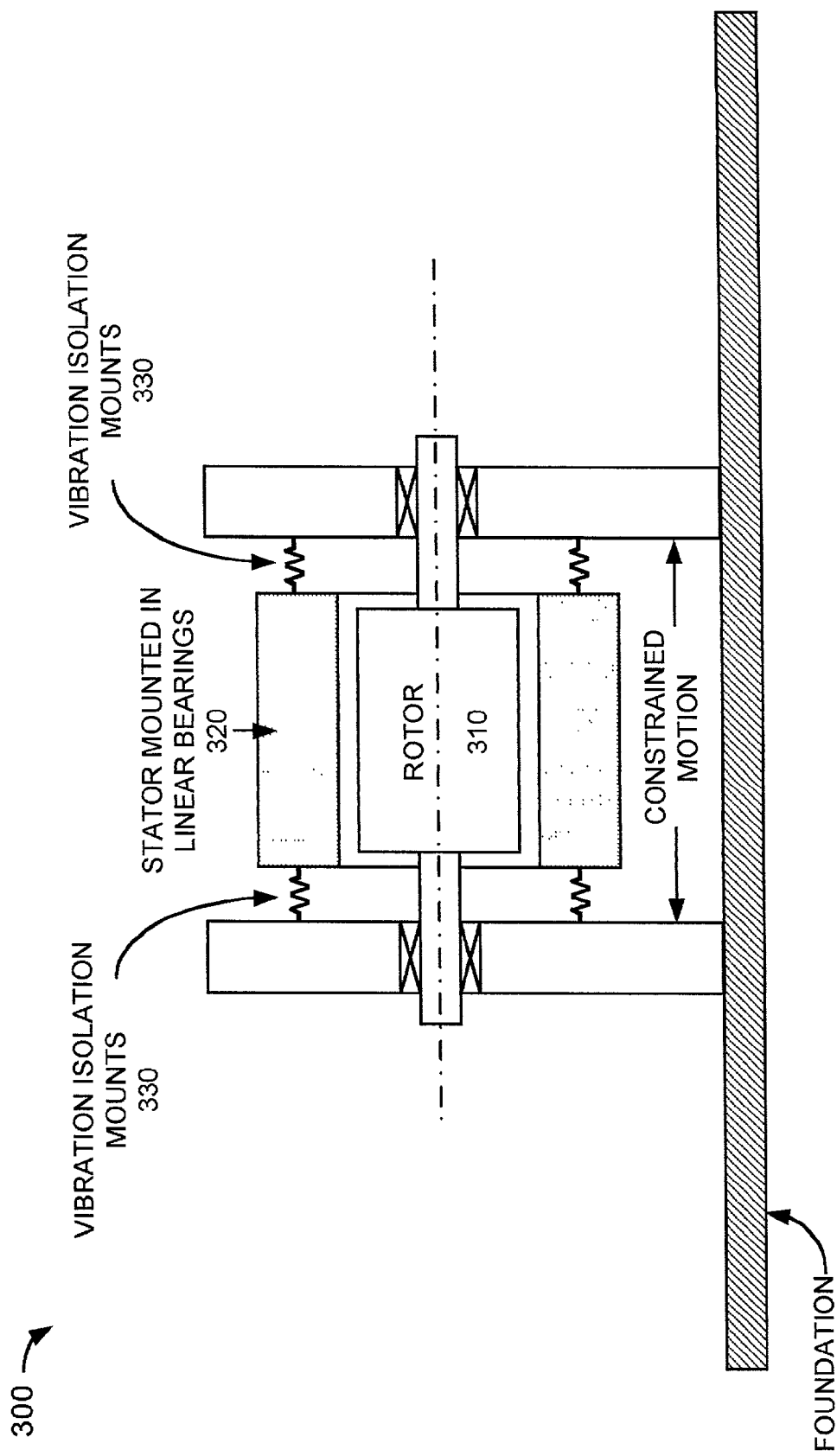
FIG. 3 illustrates an exemplary alternative configuration of a compliant stator motor in an implementation consistent with the present invention.

FIG. 3 illustrates an exemplary alternative configuration of a compliant stator motor 300 according to an implementation consistent with the present invention. As illustrated, the compliant stator motor 300 includes a rotor 310, a stator 320, and vibration isolation mounts (or isolators) 330.

The rotor 310 may include any type of rotor, such as those used in permanent magnet electric motors. The stator 320 may include main and auxiliary windings (not shown). In this configuration, the stator 320 is mounted in linear bearings in a known manner. The linear bearings constrain the motion of the stator 320 in the radial and tangential (torque) directions, while allowing the stator 320 to move in the axial direction. The linear bearings may be the type commonly used in motors, or alternatively may be special linear bearings designed for more rugged applications.

The vibration isolators 330 provide isolation in the axial direction. Similar to the description above with respect to FIGS. 2A and 2B, the isolators 330 may be formed of an elastomeric (i.e., rubber-like) material. The size of the isolators 330 depends on the size of the motor 300 being supported. The larger the motor size, the larger the size of the isolators 330. Since the isolators 330 would be required to support a lower load (only axial direction) than in the configuration illustrated in FIGS. 2A and 2B where the isolators 240 support axial, radial, and tangential directions, the isolators 330 may be smaller and have a lower load capacity. Four isolators 330 are illustrated in FIG. 3 for simplicity. In practice, more or fewer isolators 330 may be used.

In general, the auxiliary windings produce very robust forces in the radial and tangential directions while producing much weaker forces in the axial direction. Consequently, the axially oriented compliant stator 320 would ensure that the weaker axial auxiliary winding forces would be transmitted with little attenuation to the foundation. The stronger radial and tangential auxiliary winding forces may be attenuated, but because they are so robust, the attenuation might be less detrimental.

CONCLUSION

Systems and methods, consistent with the present invention, provide compliance between the stator and the motor case of an electric motor to increase the effectiveness of the auxiliary windings in generating forces on the motor foundation. These forces can be used to cancel external forces applied to the motor shaft or housing of the motor.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A motor comprising:
   a rotor;
   a stator located external to the rotor and including main and auxiliary windings;
   an outer motor case; and
   a plurality of pieces compliant mounts positioned between the stator and outer motor case and configured to enhance forces applied to a foundation due to excitation of the auxiliary windings.

2. The motor of claim 1 wherein the pieces of compliant mounts are of an elastomeric material.

3. The motor of claim 1 wherein the auxiliary windings generate forces, and wherein the outer motor case attaches to a foundation and reacts the forces generated by the auxiliary windings.

4. The motor of claim 1 wherein the pieces of compliant mounts are symmetrically positioned about an axis of the motor.

5. The motor of claim 1 wherein the compliant mounts are positioned to be in shear for radial and axial deflections and in compression for rotation about an axis of the motor.

6. An electromechanical machine comprising:
   a rotor;
   a stator located external to the rotor and including main and auxiliary windings;
   linear bearings configured to constrain a motion of the stator to an axial direction; and
   a plurality of pieces compliant mounts connected to the stator and configured to enhance axial forces applied to a foundation due to excitation of the auxiliary windings.

7. The electromechanical machine of claim 6 wherein the pieces of compliant mounts are formed of an elastomeric material.

8. A method for implementing a motor including a rotor and a stator, comprising:
   providing an outer motor case, the outer case reacting torque applied by the stator to the rotor; and
   providing a plurality of pieces compliant mounts between the stator and the outer motor case, the compliant mounts being configured to react torque.

* * * * *

UNITED STATES PATENT AND TRADEMARK OFFICE
CERTIFICATE OF CORRECTION

PATENT NO. : 6,930,416 B1
DATED : August 16, 2005
INVENTOR(S) : Remington et al.

It is certified that error appears in the above-identified patent and that said Letters Patent is hereby corrected as shown below:

Column 4,
Line 55, after the words "a plurality of pieces" add the word -- of --.

Column 5,
Line 10, after the words "a plurality of pieces" add the word -- of --.

Column 6,
Line 8, after the words "a plurality of pieces" add the word -- of --.

Signed and Sealed this

Eighteenth Day of October, 2005

JON W. DUDAS
*Director of the United States Patent and Trademark Office*